Sept. 6, 1955 A. C. SCHROEDER 2,717,276

COLOR TELEVISION SYSTEM

Filed Aug. 11, 1953 2 Sheets-Sheet 1

INVENTOR
ALFRED C. SCHROEDER
BY [signature]
ATTORNEY

INVENTOR.
ALFRED C. SCHROEDER
BY
ATTORNEY

United States Patent Office 2,717,276

Patented Sept. 6, 1955

2,717,276

COLOR TELEVISION SYSTEM

Alfred C. Schroeder, Upper Southampton Township, Bucks County, Pa., assignor to Radio Corporation of America, a corporation of Delaware Application August 11, 1953, Serial No. 373,621

The terminal 15 years of the term of the patent to be granted has been disclaimed 11 Claims. (Cl. 178—5.4)

This invention relates to color television, and particularly to a color television system without crosstalk.

In any double sideband transmission system two sets of information may be transmitted simultaneously without crosstalk from one into the other. Modern color television systems employ a method of frequency spectrum conservation wherein two or more signals appear on a subcarrier wave. By modulating the subcarrier wave in amplitude with one set of signals and by modulating it in phase with another, the chroma and hue information, or so-called "chrominance" signal, is impressed upon the subcarrier wave. A so-called "luminance" signal, derived from an ordinary black and white camera or from a combination of signals respectively representing the three colors, is then combined with the phase and amplitude modulated subcarrier wave in such a fashion that the original three color signals are recovered.

In order to conserve bandwidth because of the desirability of transmitting the color television signals within a portion of the spectrum no larger than that required for monochromatic television, a vestigial sideband system is employed. At modulation frequencies up to about 400 kc., the upper and lower sidebands of the low frequencies are both transmitted. At frequencies higher than 400 kc. the upper sidebands resulting from modulation of the color subcarrier by a color component are suppressed, since they fall outside the prescribed bandwidth. The suppressing of the upper sidebands results in crosstalk which may appear as undesirable "spikes" in the viewed image.

A possible way of overcoming this distortion is to use only the color subcarrier sideband region in which double sideband operation can be realized. If the passbands of color demodulators in the receiver are so limited there would be approximately 400 kc. of double sideband operation. The color resolution would be limited, however, by this frequency and when the chrominance and luminance signals are added, a reasonable color reproduction might result having no appreciable crosstalk, but having the concomitant disadvantage of limited color resolution.

A more satisfactory solution to the problem has been proposed wherein signals having frequencies somewhat above 400 kc., i. e., the so-called "single sideband region" are transmitted in two colors by modulating a subcarrier by a single vectorial component, whereas those below 400 kc., the so-called "double sideband region" are transmitted in three colors. In the single sideband region despite the fact that only one vectorial component is used to modulate the color subcarrier, two colors may be derived therefrom at the receiver. This results from the fact that the luminance signal, which contains portions of each of the three color signals is combined at the receiver with the demodulated color signals. The choice of the particular two colors to be effectively transmitted in the single sideband region depends primarily on optical considerations. Since the eye is not able to detect color detail in the blue as well as it can in other primaries, one form of the present invention will be explained in terms of omitting a blue primary in the single sideband region. However, it is possible by using the principles and apparatus herein described to derive a number of other combinations of two colors to be transmitted in this region, and the present invention is not therefore restricted to the sysem in which green and red are transmitted in this region.

In accordance with this invention the transmitter produces a standard chromaticity signal and a monochrome signal at frequencies below 400 kc. At somewhat higher frequencies one of the three color signals is cut off in both the monochrome channel and in the chromaticity or color channel. The other two color signals which are fed to the monochrome channel are amplified somewhat to make up for the loss of the high frequency components of the omitted color signals. The level of the inputs to the modulators corresponding to the other two colors may then be raised considerably in order to compensate for the loss in amplitude of the chromaticity signal resulting from the loss of the upper sideband. In addition, one of the two remaining color signals is fed not only to its own modulator but also to the modulator for the omitted color signal in the lower frequencies. The proportions fed to these latter two modulators are so chosen that the resultant of their outputs is effectively 180° out of phase with the output of the modulator for the other remaining signal. Corresponding apparatus for the reception of signals thus transmitted is also provided.

An object of this invention is to provide an improved color television system from which crosstalk resulting from single sideband transmission is eliminated.

It is a further object of this invention to provide means for generating signals representative of color information which, when transmitted in accordance with the aforementioned principles, results in a more effective use of an allotted channel bandwidth.

It is still another object of the present invention to provide means for improving color edge reproduction of color television images.

Other advantages of this invention will become apparent upon a detailed consideration of the drawings in which.

Figures 1, 2:
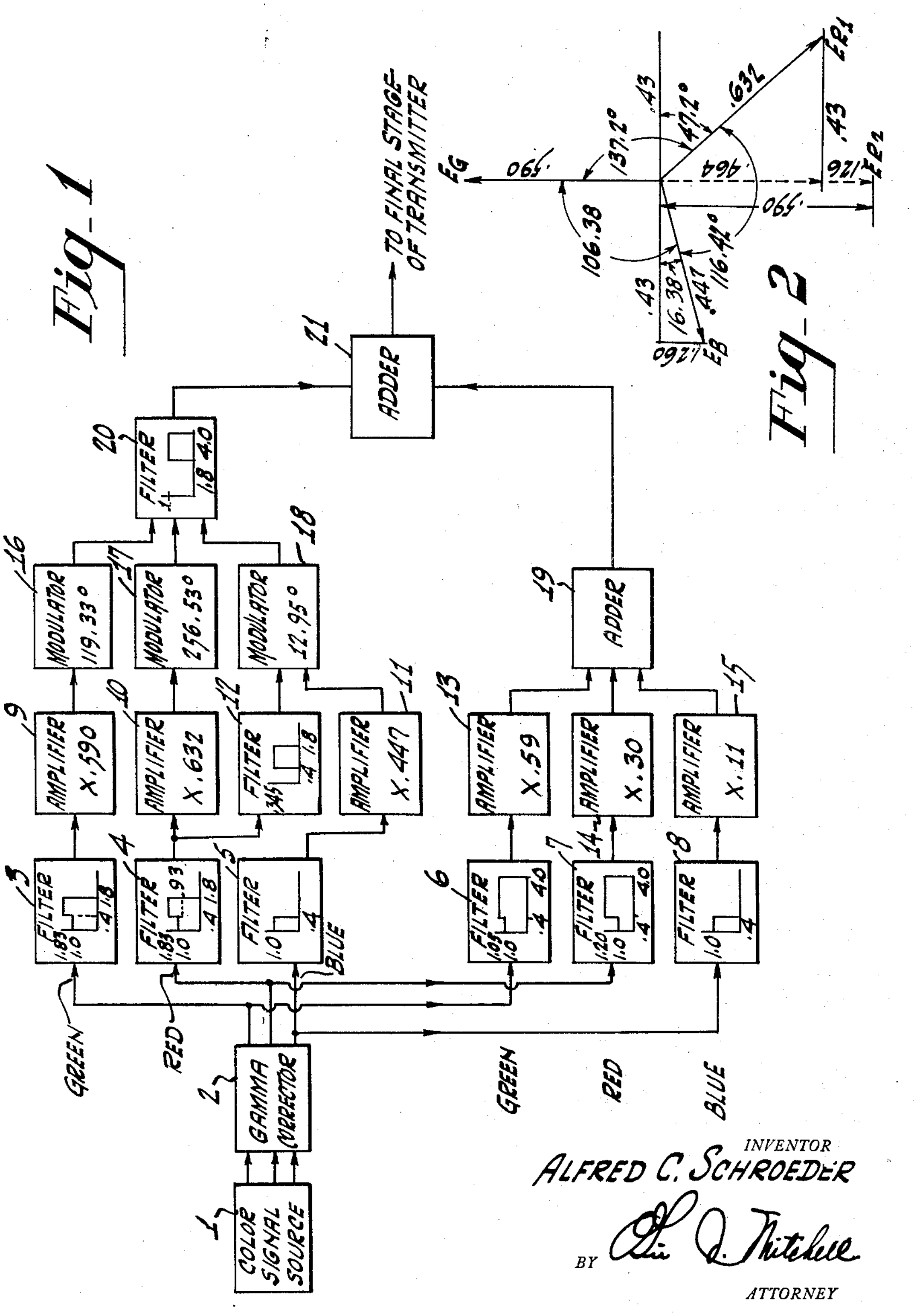
Figure 1 is a block diagram of a color television transmitter employing the principles of this invention.
Figure 2 is a vector diagram illustrating the operation of Figure 1.
Figure 3:
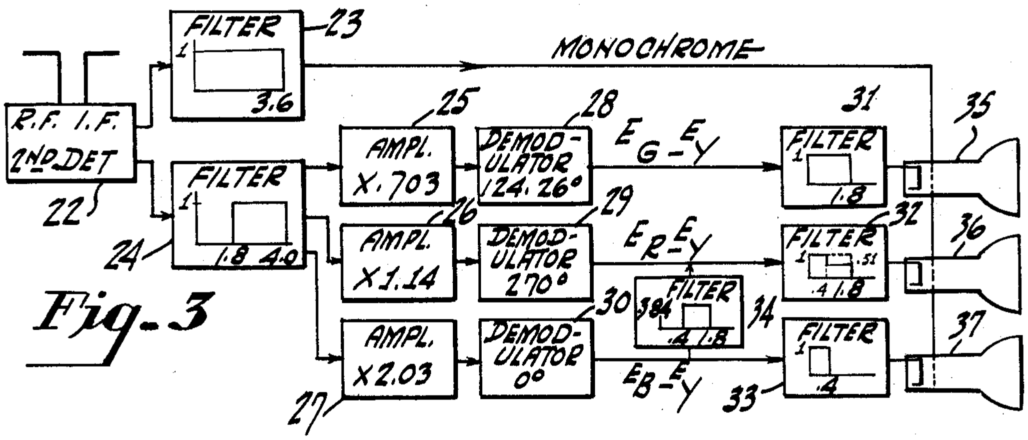
Figure 3 is a block diagram of a receiver constructed according to the principles of this invention.

Referring to Figure 1, the output of the color signal source 1 consisting of signals corresponding to each of the three primary colors is fed to gamma corrector 2. Source 1 may consist of one or more cameras with appropriate filters, for example. Here a correction is made for the fact that the light output of the picture tube is not directly proportional to the electrical input. This factor is useful because non-linearity improves the signal-to-noise ratio at the receiver. Therefore, a certain amount of predistortion is introduced at the transmitter. The predistorted or gamma corrected color signals are then applied to two channels. One channel commonly called the chromaticity channel begins at filters 3, 4 and 5. The other channel is the monochrome channel and begins at filters 6, 7 and 8. The characteristics of each of the filters illustrated in Figures 1 and 3 are plotted in their respective blocks as relative amplitude (vertical coordinate) versus frequency in megacycles (horizontal coordinate). In the latter channel the color signals are added to produce what is known as the monochrome or luminance signal, which is that component of the transmitted composite wave that enables the system to be compatible with present day so-called black and white receivers. That is to say, even though the transmitted composite video signal can be detected in colors by appropriate means, it may also be detected in monochrome or black and white by the usual monochrome television receiver.

It is to be noted that the filters 3, 4 and 5 of the chromaticity channel have somewhat different frequency responses than is customary. Green filter 3 has the characteristic that frequencies up to approximately 400 kc. are slightly attenuated with respect to frequencies above 400 kc. up to about 1.8 mc. where considerably more (i. e., 183%) of the frequencies are passed. Red filter 4 has characteristics similar to filter 3. However, blue filter 5 is a low pass filter and cuts off sharply at approximately 400 kc. Thus up to about 400 kc. signals of all three colors are passed, but beyond this point the blue signal is effectively suppressed. To compensate for the loss in amplitude of the chromaticity signals due to the loss of the upper sideband, the filters 3 and 4 have greater response in the single sideband region, i. e. above 400 kc. In addition, amplifier 9, to which the green signal is applied increases the latter before feeding it to modulator 16. Similarly amplifier 10 increases part of the output of red filter 4 before applying it to modulator 17. Since blue filter 5 has a sharp cutoff at 400 kc. a part of the red signal output of filter 4 is also applied to filter 12 whose output is impressed upon blue modulator 18. Up to 400 kc. the output of filter 5 is amplified in amplifier 11 and applied to another input of modulator 18. So it is seen that when blue filter 5 is at cutoff red filter 12 passes part of the red signal from filter 4 to the blue modulator 18.

A subcarrier operating with a frequency of 3.58 mc. or 3.89 mc., or any designated frequency, is modulated at various phases by each of the three primary colors. Throughout this specification it will be assumed that the modulators and the demodulators have been fed with a wave from an appropriate source which will not be illustrated. Green modulator 16 is operative at 119.33°. Red modulator 17 is operative at 256.53° or 137.2° behind green modulator 16. Modulator 18, which serves the blue channel up to 400 kc. and part of the red output in the single sideband region, operates at 12.95°. The combined outputs of the modulators 16, 17 and 18 are applied to high pass filter 20 and thence to one input of adder stage 21.

In the monochrome channel, a similar cutoff of the blue component signal occurs and a consequent readjustment of the other two color signals takes place. Up to 400 kc. the green filter 6 and the red filter 7 pass less of these signals than they do when the frequency components of the green and red signals extend into the single sideband region as shown by the curves of filters 6 and 7. Blue filter 8 on the other hand has response only up to 400 kc. and is characterized by sharp cutoff thereafter. When the blue signal input is suppressed beyond 400 kc. the response of filters 6 and 7 is increased to compensate for the loss of the blue high frequencies. Amplifiers 13, 14 and 15 having the gain characteristics as shown in Figure 1 operate conventionally within the double sideband region and their outputs are combined in proportion to their contribution to the total luminance as specified in Figure 1. Adder 19 combines these proportions of the primary color signals and applies the sum to another input of adder stage 21. In adder 21 the signals of the chromaticity and monochrome channels are mixed before application to the final stages of the transmitter which are not shown because they may be conventional and form no part of this invention.

Figure 2 shows in vector form how some of the constants employed in Figure 1 are derived in the single sideband region. Respective portions of the red signal modulate both the red vector $E_{R_1}$ at 137.2° relative to the green vector $E_G$ and the blue vector $E_B$ at 253.62° (i. e. the sum of 137.2°+116.42°) to produce resultant vector $E_{R_2}$. If the red vector $E_{R_1}$ is modulated with a signal of .632 then the blue must be modulated with .447 to make the resultant vector $E_{R_2}$ 180° out of phase with vector $E_G$. The resultant vector $E_{R_2}$ has an amplitude of .590 which is exactly equal to that of vector $E_G$. The mathematical expression for the amplitude modulated output of the vectors of Figure 2 is then $$.590\ (E_G - E_{R_2}) \times .5$$

The .5 is inserted to compensate for the loss of the sideband.

As described, the monochrome signal has the following composition in the double sideband region:

$$E_Y = .59E_G + .30E_R + .11E_B$$

In the high frequency or single sideband region, the blue component disappears and the green and red components are boosted so that the equation now reads:

$$E_Y = .62E_G + .38E_R$$

The values of this equation represent more or less arbitrary values of $E_G$ and $E_R$ but have been derived so as to make the system consistent with the other constants herein. Other values may also be used but if so, the other constants of the system must be changed to conform.

Figure 3 shows one typical receiving apparatus for converting the transmitted signals into color images. Block 22 represents the R. F., I. F. and second detector stages of a conventional receiver whose characteristics are well known to those skilled in the art. The output of block 22 is applied to filters 23 and 24 which operate as the input to the luminance and chromaticity channels respectively. The response of filter 23 is as shown and effectively is flat in most of the region in which the monochrome information is transmitted. The output of filter 23 may be applied to the grids of three color reproducing tubes 35, 36 and 37 or the grids of a tri-color kinescope as described in a paper by H. B. Law titled "A Three-Gun Shadow Mask Color Kinescope" published in the Proceedings of the I. R. E., volume 39, No. 10, October 1951, at page 1186. U. S. Patent No. 2,595,548, granted May 6, 1952, to A. C. Schroeder also discloses such a kinescope.

Filter 24 on the other hand is a high pass filter with characteristics as shown, and its output is split into three parts and applied to amplifiers 25, 26 and 27 having the gains indicated. The outputs of amplifiers 25, 26 and 27 are impressed upon corresponding demodulators 28, 29 and 30 operating at phase angles of 124.26°, 270° and 0° respectively. The outputs of demodulators 28 and 29 are the green color difference signal, $E_G - E_Y$, and the red color difference signal $E_R - E_Y$, which are applied to filters 31 and 32 respectively having response characteristics as shown. The derivation of the .51 level of filter 32 will be explained in detail below. The blue color difference signal, $E_B - E_Y$, appears in the output of blue demodulator 30. Below 400 kc. it is applied to filter 33, but above 400 kc. it is applied to filter 34. The latter filter has a high response in the single sideband region and its output is applied to filter 32 to which the red color difference signal $E_R - E_Y$ is normally applied. This feeding of the components of the blue signal above 400 kc. into the red gun is regulated in such proportion that the outputs of the red demodulator 29 and the blue demodulator 30 behave as if they were one demodulator at 180° out of phase with green demodulator 28.

Figure 4:
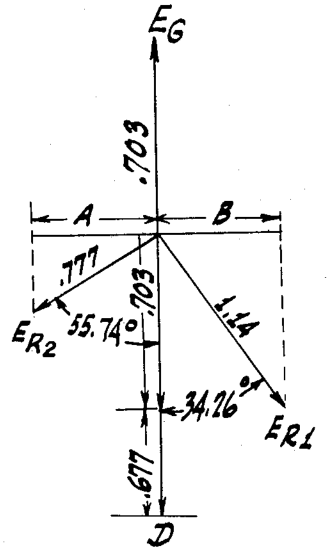
Figure 4 is a vector diagram of the operation of the receiver depicted in Figure 3.

Figure 4 shows a vector diagram that is helpful in explaining the derivation of the constants chosen in Figure 3. The amplitude of the output of the blue demodulator 30 must be multiplied by .384 so that its horizontal projection A is exactly equal and opposite to the red horizontal projection B. When this is done the combined output of the two demodulators 29 and 30 is 180° out of phase with the output of the green demodulator 28. The amplitude of the resultant vector D is 1.38, which is larger than the $E_G$ vector by .677 and consequently must be reduced by that amount. This may be accomplished by reducing the response of filter 32 in the single sideband region to .51 which makes the effective output vector $E_{R_2}$ equal to .703 and thus opposite and equal to the $E_G$ vector having an amplitude of .703.

An alternative method of accomplishing this is by reducing the characteristic of filter 4 of Figure 1 to the amplitude shown by the dotted line, i. e., .93 in the region from 400 kc. to 1.8 mc.

Still another method would be to raise the characteristic of filter 31 of Figure 3 to about 1.96 in the single sideband region, but this has the disadvantage that too many high frequency components of the green signal are passed to the cathode of camera tube 36. The desired amplitude of $E_{R_2}$ vector of Figure 4 may be achieved also by altering the characteristics of filters 3 and 4 of Figure 1 and making calculations for the rest of the system on these new bases.

Referring back to Figure 1, it is now possible to calculate the amplitudes of the filters 3 and 4. Since the signal on the cathode of kinescope 36 (Figure 3) is $$E_G - E_Y = .38E_G - .38E_R$$

the input signal in the band ranging from 400 kc. to 1.8 mc. is $$X_G = \frac{.38}{.590} \times .703 \times .5$$

wherein $X_G$ is the unknown value of the green signal that is to be passed by filter 3 and the factor .5 is inserted to compensate for the loss of one sideband. The quantity .703 is the value of vector $E_{R_2}$ as derived above. Calculating this out it is seen that $X_G = 1.83$. This then is the level at which filter 3 operates in the single sideband region as shown in Figure 1.

Following a similar process one can arrive at the value of red signal which is to appear in the output of filter 4 of Figure 1. The calculation is as follows:

$$E_R - E_Y = -.62E_G + .62E_R$$

$$X_R = \frac{.62E_R}{.590} \times 1.14 \times .5$$

$$X_R = 1.83$$

which is the value as shown in filter 4 of Figure 1.

Having described the present invention, what is claimed is:

1. A color television system comprising in combination, a source of three gamma corrected voltage waves representative of three primary colors of televised objects respectively, means coupled to said source for modulating each of three phases of a subcarrier by the double sideband frequency components of each of said three voltage waves respectively, means for modulating said three phases of said subcarrier by portions of the single sideband frequency components of two of said voltage waves, said portions of said single sideband components of said two voltage waves being adjusted to compensate for the omission of the single sideband components of the third of said voltage waves in the modulation of said phases, means for producing a signal representative of the luminance of said televised objects, said luminance signal producing means comprising means for combining predetermined amounts of the double sideband frequency components of each of said three voltage waves, means for combining predetermined amounts of the single sideband frequency components of said two voltage waves whose single sideband frequency components are used to modulate said subcarrier, said last mentioned predetermined amounts being adjusted to compensate for the omission of the single sideband frequencies of said third voltage wave from said luminance signal, means for combining said luminance signal with the products of modulation of said subcarrier by said voltage waves to produce a composite video wave, means for detecting said composite wave, means coupled to said detecting means for extracting said luminance signal from said composite wave, means coupled to said detecting means for demodulating said composite wave from which said luminance signal has been extracted, said demodulating means producing three color difference signals respectively, a display device having three input circuits, means for applying one of said color difference signals to a first of said input circuits, means for applying portions of a second and third of said color difference signals to a second of said input circuits, means for applying only the double sideband frequencies of the third of said color difference signals to a third of said inputs, and means for applying said luminance signal to each of said input circuits.

2. A color television system comprising in combination, a source of three gamma corrected voltage waves representative of three primary colors of televised objects respectively, means coupled to said source for modulating each of three phases of a subcarrier wave with predetermined amounts of frequencies of each of said gamma corrected waves which lie within a first restricted frequency region, said first restricted frequency region including frequencies below a predetermined frequency, means coupled to said source for modulating said subcarrier wave phases with predetermined amounts of frequencies of two of said voltage waves which lie within a second restricted frequency region, said second restricted frequency region containing frequencies above said predetermined frequency, means coupled to said modulating means for passing a selected frequency band, means coupled to said source for combining predetermined amounts of frequencies of each of said voltage waves which lie within said first restricted frequency region, means coupled to said souce for combining predetermined amounts of frequencies of two of said voltage waves which lie within said second restricted frequency region, said last two combining means being adapted to produce a signal representative of the luminance of televised objects, means for combining said luminance signal and said passed selected frequency band to form a composite color video wave, means for detecting said composite wave, means for applying predetermined amounts of said composite wave from which said luminance signal has been separated to each of three demodulators operating at three phase angles of a reference wave, said reference wave having the same frequency as said subcarrier, each of said demodulators thereupon producing one of three color difference signals respectively, means for applying a restricted frequency portion of one of said color difference signals to a display device, means for applying a restricted frequency portion of a second of said color difference signals to said display device, said last named applying means also being adapted to apply a frequency restricted portion of said third color difference signal to said device, means for applying a frequency restricted portion of a third of said color difference signals to said device, and means for applying said luminance signal to said device.

3. A color television system comprising in combination, first, second and third modulators operating at different phase angles, a subcarrier wave source coupled to each of said modulators, respective sources of three voltage waves representative of the blue, green and red hues of televised objects respectively, said voltage waves containing frequencies lower and frequencies higher than a predetermined frequency, said lower frequencies being the double sideband frequencies of said voltage waves, said higher frequencies being the single sideband frequencies of said voltage waves, means for applying predetermined first portions of the double sideband frequencies of each of said voltage waves to each of said modulators for modulating each of said subcarrier wave phases therewith, means for applying predetermined second portions of the single sideband frequencies of the voltage waves corresponding to the green and red hues to said modulators, said second portion of said green hue being applied to said first modulator, said second portion of said red hue being applied to said second and third modulators, means for combining all products of said modulation, means for producing a luminance signal component, said luminance signal component producing means comprising means for adding predetermined portions of the double sideband frequencies of each of said voltage waves, said adding means also being adapted to combine predetermined amounts of increased portions of the single sideband frequencies of the green and red voltage waves, means coupled to said modulation products combining means and to said luminance signal producing means for producing a composite color video wave, means for detecting said composite color video wave, means for separating said luminance signal component from said composite wave, first, second and third demodulators, means for applying predetermined amounts of restricted frequency portions of said composite wave to each of said demodulators, each of said demodulators being operative at a different phase angle with respect to said subcarrier wave, said first demodulator producing green color difference signals, said second demodulator producing red color difference signals, said third demodulator producing blue color difference signals, first, second and third filters coupled to said first, second and third demodulators respectively, a display device coupled to said filters and to said luminance signal component separating means, said first filter being adapted to apply said green color difference signals to said display device, and a bandpass filter coupled to said third demodulator and to said second filter, said bandpass filter being adapted to apply the single sideband frequencies of said blue color difference signals to said second filter, said second filter being adapted to apply said red color difference signals and said single sideband frequencies of said blue color difference signals to said display device, said third filter being adapted to apply the double sideband frequencies of said blue color difference signals to said display device.

4. A color television system comprising in combination, a source of gamma corrected voltage waves representative of the primary colors of televised objects, first means for combining first portions of each of said waves lying within a first frequency restricted region, said first region containing frequency components below a given frequency, said first combining means also being adapted to combine second portions of two of said waves lying within a second frequency restricted region, said second region containing frequency components above said given frequency, said first combining means being adapted to produce a signal representative of the luminance of said televised objects from said first and second portions, first, second and third means for modulating three phases of a subcarrier wave, a first plurality of means for applying predetermined amounts of frequencies of each of said voltage waves lying within said first frequency restricted range to each of said modulating means, a second plurality of means for applying predetermined amounts of frequencies of two of said voltage waves lying within said second frequency restricted range to said modulators, means coupled to each of said modulators for passing a band of frequencies, and second means coupled to said first combining means and to said pass band means for combining said passed band with said luminance signal.

5. The invention according to claim 4 wherein said second plurality of applying means includes means for applying a predetermined amount of the frequencies of one of said two gamma corrected voltages lying in said second frequency range to said first modulating means, means for applying a portion of frequencies of the second of said two voltage waves lying within said second frequency range to said second modulating means, and means for applying another portion of the frequency components of said second of said two gamma corrected voltages lying within said second range to said third modulating means.

6. A system of color television transmission comprising in combination, a source of first, second and third voltage waves representative of the green, red and blue components of televised objects, a first filter and a second filter, each of said filters adapted to pass lesser amounts of frequencies lower than a given frequency and greater amounts of frequencies higher than said given frequency, said first filter being coupled to said source so as to receive said green components, said second filter being coupled to said source and adapted to receive said red components, a third filter adapted to pass only frequency components below said given frequency, said third filter coupled to said source for receiving said blue components, first, second and third modulators operating at different phase angles of a subcarrier frequency, a first amplifier coupled to said first filter and to said first modulator for amplifying signals from said first filter by a predetermined amount, a second amplifier coupled to said second filter and to said second modulator for amplifying signals from said second filter by a predetermined amount, a third amplifier coupled to said third filter and to said third modulator for amplifying signals from said third filter by a predetermined amount, a fourth filter coupled to said second filter and to said third modulator for passing only frequencies higher than said given frequency applied to it from said second filter, a fifth filter coupled to said first, second and third modulators, said fifth filter being adapted to pass a band of frequencies applied to it from said modulators, sixth and seventh filters coupled to said source for passing lesser amounts of said voltage waves in a frequency region below said given frequency and greater amounts of said voltage waves in the frequency region above said given frequency, an eighth filter coupled to said source for passing only frequencies of said voltage waves lower than said given frequency, fourth, fifth and sixth amplifiers coupled to said sixth, seventh and eighth filters respectively for amplifying signals from said filters by predetermined amounts, means coupled to said last named amplifiers for combining said amplified signals, and means coupled to said last named combining means and to said fifth filter for combining said combined amplified signals and said band of frequencies passed by said fifth filter.

7. A color television receiver comprising in combination, means for detecting a composite color video wave, said wave including a luminance component and color components, said color components including products of modulation of each of three phases of a subcarrier by one of three voltage waves representing respectively the red, green and blue hues of televised objects, means for separating the luminance component from said composite wave, means for separating the color components from said composite wave, a plurality of amplifiers coupled to said color component separating means, each of said amplifiers adapted to amplify a portion of said separated color components by different predetermined amounts, first, second and third demodulators coupled to a different one of said amplifiers respectively, each of said demodulators operating at a different phase angle with respect to said subcarrier, said first demodulator being adapted to produce green color difference signals, said second demodulator being adapted to produce red color difference signals, said third demodulator being adapted to produce blue color difference signals, first and second filters coupled to said first and second demodulators respectively, said first filter being adapted to pass a frequency restricted portion of said green color difference signals, a bandpass filter coupled to said third demodulator and to said second filter, said bandpass filter adapted to apply frequency components of said blue color difference signals lying above a predetermined frequency to said second low pass filter, said frequencies lying above said predetermined frequencies being the single sideband frequencies of said blue color difference signals, a third filter coupled to said third demodulator, said third filter having an upper cut off frequency equal to said predetermined frequency, said third filter adapted to pass frequencies lower than said predetermined frequency, said lower frequencies being the double sideband frequencies of said blue color difference signals, and reproducing means coupled to said luminance component separating means and to said first, second and third filters, said reproducing means being operative to produce images corresponding to said televised objects.

8. Television apparatus for receiving a composite color video wave representative of televised objects which includes a luminance signal and a subcarrier which has been modulated by color voltage components comprising in combination, means for detecting said composite color video wave, means coupled to said detecting means for separating said luminance signal from said composite wave, means coupled to said detecting means for separating the frequency components of said composite wave which lie in the frequency region of said subcarrier modulated by said color components, first amplifier coupled to said color component frequency separating means, a first demodulator operating at a first phase angle with respect to said subcarrier frequency coupled to said first amplifier, said first demodulator being adapted to produce first color difference signals, a first filter adapted to receive said first color difference signals from said first demodulator, second and third amplifiers coupled to said color frequency component separating means, second and third demodulators coupled to said second and third amplifiers respectively, said demodulators operating at different phase angles with respect to said subcarrier frequency, said second and third demodulators being adapted to produce second and third color difference signals respectively, a second filter coupled to said second demodulator, said second filter having the same upper cut off frequency as said first filter, a third filter coupled to said third demodulator having an upper cut off frequency substantially lower than that of said first and second filters, a bandpass filter coupled to said third demodulator and to said second filter, said bandpass filter passing a band of frequencies lying between the upper cut off frequency of said third filter and the upper cut off frequency of said first and second filters, and display means coupled to said luminance signal separating means and to said first, second and third filters, said display means being adapted to reproduce images corresponding to said televised objects.

9. A system for receiving a composite color video wave comprising in combination, means for detecting said composite color video wave, means coupled to said detecting means for separating luminance components from said wave, first frequency selective means coupled to said detecting means for passing a band of frequencies higher than a first predetermined frequency, first, second and third amplifiers coupled to said first frequency selective means for amplifying first, second and third portions of signals from said first frequency selective means by predetermined amounts, first, second and third demodulators coupled to a different one of said first, second and third amplifying means respectively, each of said demodulators operating at a different phase angle with respect to a reference frequency, each of said demodulators being adapted to produce one of three color difference signals, second and third frequency selective means coupled to said first and second demodulators respectively, said second and third frequency selective means being adapted to pass frequencies up to said first predetermined frequency, a fourth frequency selective means coupled to said third demodulator and to said second frequency selective means for applying a predetermined band of frequencies to the latter, said predetermined band having a second predetermined frequency as its lower limit and said first predetermined frequency at its upper limit, a fifth frequency selective means coupled to said third demodulator, said fifth filter being adapted to pass frequencies up to said second given frequency, and display means coupled to said luminance component separating means and to said second, third and fifth frequency selective means.

10. In a television system in which signals are transmitted which contain a component representative of the luminance of televised objects and in which said signals also contain components representative of the chrominance of said objects, the combination comprising a source of a subcarrier wave, first, second and third means for modulating three respectively difference phases of said subcarrier wave, a source of first, second and third voltage waves respectively representative of selected color components of said object, said voltage waves each containing frequencies lower and higher than a predetermined frequency, said lower frequencies being the double sideband frequencies of said voltage waves, said higher frequencies being the single sideband frequencies of said voltage waves, means for applying predetermined first portions of the double sideband frequencies of each of said three voltage waves to a corresponding one of said modulating means for modulating each of said subcarrier wave phases therewith, and means for applying predetermined second portions of the single sideband frequencies of two of said voltage waves to said modulating means such that said predetermined second portion of one of said last-named two voltage waves is applied to said first modulating means and said predetermined second portion of the other of said two voltage waves is applied to both said second and said third modulating means.

11. In a television system in which signals are transmitted which contain a component representative of the luminance of televised objects and in which said signals also contain components representative of the hues of said objects, the combination comprising a source of a subcarrier wave, a source of first, second, and third voltage waves respectively representative of the blue, green and red hues of said object, said voltage waves each containing frequencies lower and higher than a predetermined frequency, said lower frequencies being the double sideband frequencies of said voltage waves, said higher frequencies being the single sideband frequencies of said voltage waves, first, second and third means for modulating three respectively different phases of said subcarrier wave, means for applying predetermined first portions of the double sideband frequencies of each of said three voltage waves to a corresponding one of said modulating means for modulating each of said subcarrier wave phases respectively, means for applying a predetermined second portion of the single sideband frequencies of the voltage wave corresponding to said green hues to said first modulating means, means for applying a predetermined second portion of the single sideband frequencies of the voltage wave corresponding to said red hues partly to said second modulating means and partly to said third modulating means, and means for combining all products of said modulations.

References Cited in the file of this patent

UNITED STATES PATENTS

| | | |
|---|---|---|
| 2,635,140 | Dome | Apr. 14, 1953 |
| 2,657,253 | Bedford | Oct. 27, 1953 |